Figure 3:
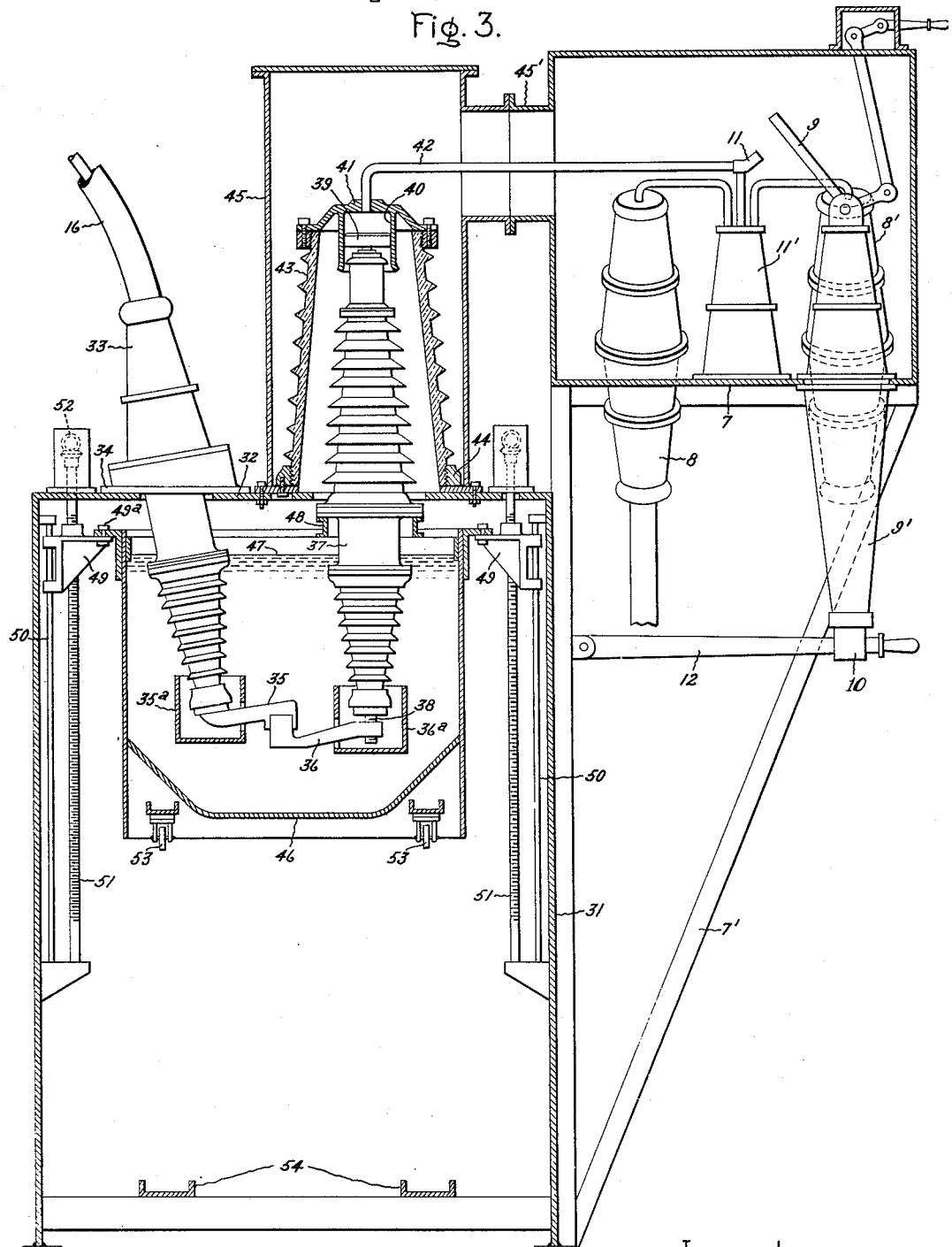

Feb. 20, 1934.  H. J. H. HUBER  1,948,350
ELECTRICAL SWITCH GEAR
Original Filed March 7, 1930  3 Sheets-Sheet 1
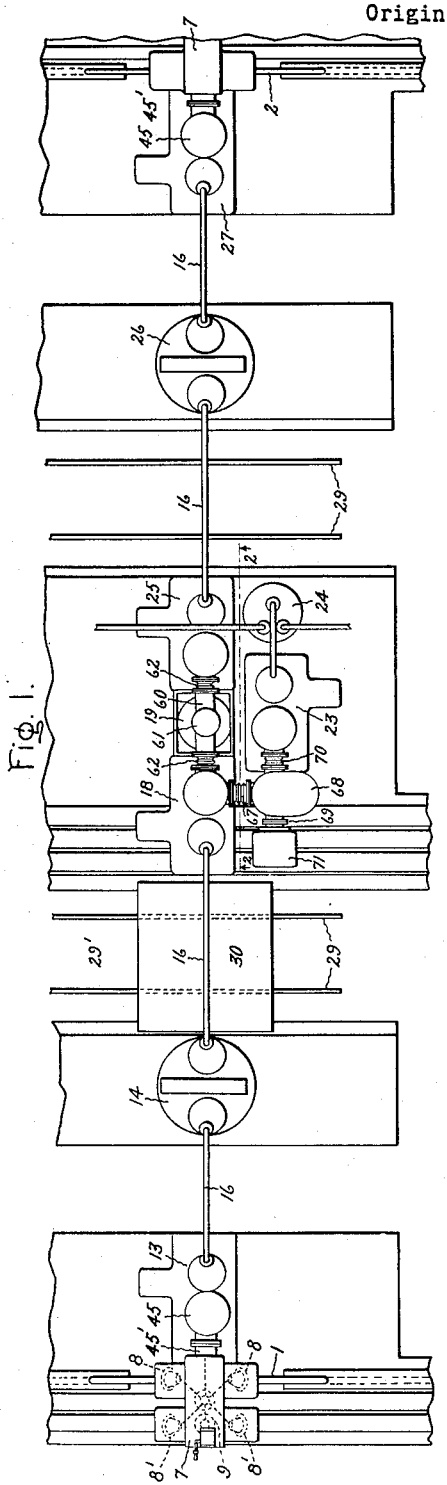
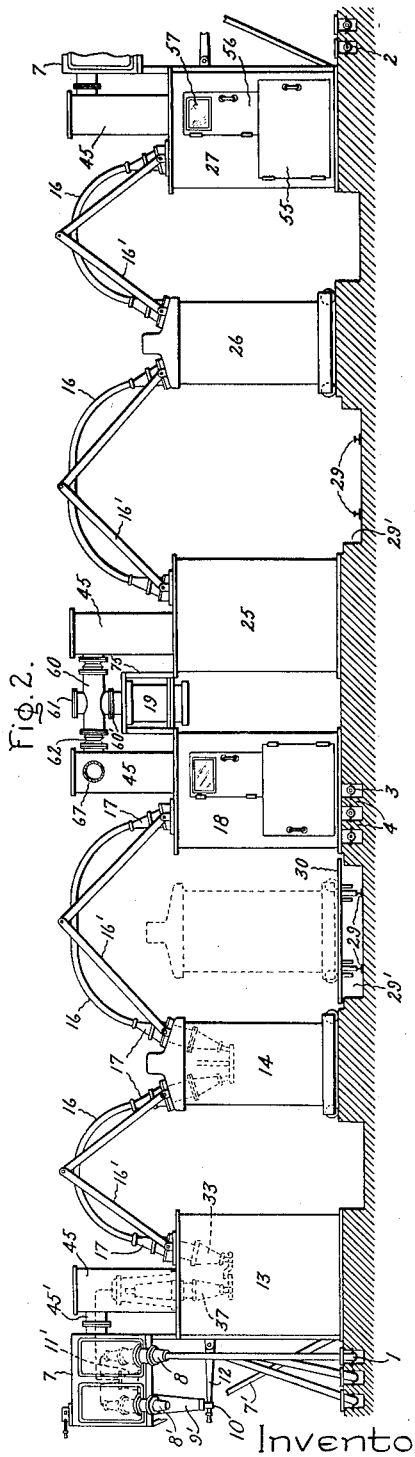
Inventor:
Herman J. H. Huber,
by Charles E. Mullen
His Attorney.

Feb. 20, 1934.  H. J. H. HUBER  1,948,350
ELECTRICAL SWITCH GEAR
Original Filed March 7, 1930   3 Sheets-Sheet 2

Inventor:
Herman J. H. Huber,
by Charles E. Tullar
His Attorney.

Feb. 20, 1934.    H. J. H. HUBER    1,948,350
ELECTRICAL SWITCH GEAR
Original Filed March 7, 1930    3 Sheets-Sheet 3
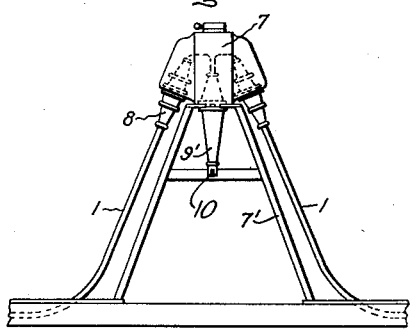
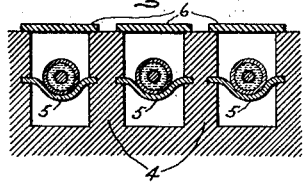
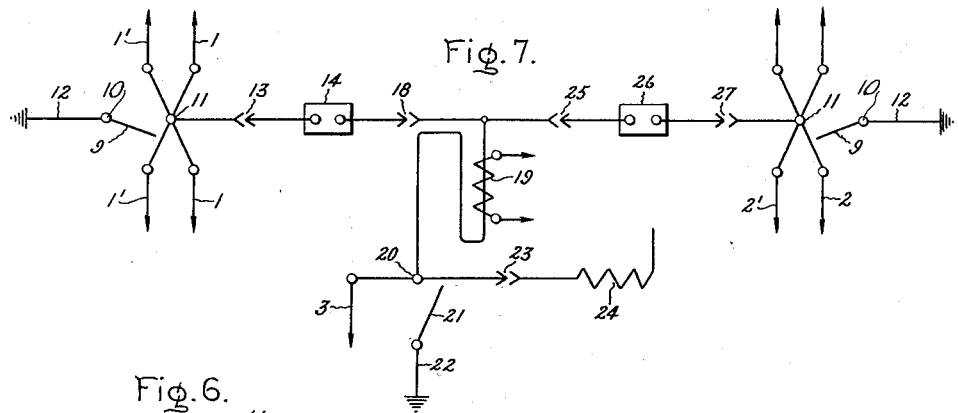
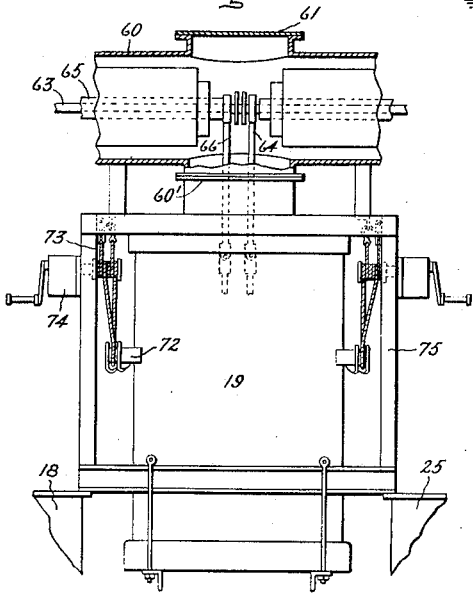
Inventor:
Herman J. H. Huber,
by Charles E. Tullar
His Attorney.

Patented Feb. 20, 1934

1,948,350

UNITED STATES PATENT OFFICE

1,948,350

ELECTRICAL SWITCH GEAR

Herman J. H. Huber, Upper Darby, Pa., assignor to General Electric Company, a corporation of New York Original application March 7, 1930, Serial No. 434,076. Patent No. 1,920,748, dated August 1, 1933. Divided and this application April 24, 1931. Serial No. 532,563

6 Claims. (Cl. 200—48)

My invention relates to electrical switchgear, and more particularly to out-door metal-clad switchgear for high voltage circuits.

In applying metal-clad switchgear to high voltage circuits such as for example 132 kilo-volts, or higher, there are involved problems relating to cost of installation, facility of assembly and maintenance, flexibility of operation of the system, and the protection of human life when parts of the equipment are to be disconnected from the buses for inspection or repair. In certain types of metal-clad switchgear wherein the oil circuit breakers, disconnecting switches, current and potential transformers, cable connections and other equipment, are all encased or armoured by metallic structure containing an insulating medium, as oil, it is very important that the operators know definitely that the oil breakers and other equipment are completely disconnected and electrically isolated from the live buses or other portions of the circuit when work is to be done on them. If the disconnecting switches are entirely oil immersed, for example, it is possible that the dielectric strength of the oil may decrease for various reasons so that the breaker is no longer electrically isolated, thereby possibly causing loss of life. Grounding connections for the open disconnect contacts within the oil offer further protection, but there is present, however, the disadvantage that the contacts are not visible, and the operators must labor under the uncertainty of poor grounding connections in addition to poor dielectric characteristics of the oil.

This application is a division of my Patent No. 1,920,748, dated Aug. 1, 1933 for Electrical switchgear.

It is an object of my invention to provide an improved disconnecting switch for isolating the oil breakers and associated equipment in metal-clad switchgear from the live parts of the circuit by an insulating fluid, as oil, and by air in the open or isolating position thereof.

My invention will be more fully set forth in the following description referring to the accompanying drawings, and the features of novelty which characterize my invention will be pointed out with particularity in the claims annexed to and forming a part of this specification.

Referring to the drawings, Fig. 1 is a plan view of a single phase of a high tension metal-clad, out-door switching station; Fig. 2 is an elevational view, partly in section with respect to the line 2—2, of the apparatus illustrated in Fig. 1; Fig. 3 is an elevational view, partly in section, of disconnecting switching structure partly illustrated in Figs. 1 and 2; Fig. 4 is an end view of the disconnecting switching structure; Fig. 5 is an elevational, sectional view of cable housing and supporting structure; Fig. 6 is an elevational view, partly in section, of structure shown in Figs. 1 and 2, and Fig. 7 is a diagrammatic illustration of circuit connections.

In Figs. 1 and 2 there is illustrated part of a high tension switching station of the metal-clad type wherein all of the current carrying parts are protected by an exterior metal casing and insulated therefrom by an insulating oil. The advantages of metal-clad switchgear are well known, and comprise greater space economy of the station due to closer grouping of the metal-clad apparatus, better insulation of the conductors since they are at all times protected from accumulations of dirt, sleet, moisture, or other substances which might tend to greatly decrease the insulation thereof, and facility of installation, due to factory built units. In high tension out-door metal-clad switchgear the disconnecting switches for the oil circuit breakers and associated apparatus must likewise be enclosed within a metallic casing in order that there shall be no live parts of the circuit exposed. For the purpose of enabling the operator to know that an oil circuit breaker or other apparatus in question is definitely isolated by air dielectric when it is to be inspected or repaired by workmen, the disconnecting switches are provided with means hereinafter described for giving assurance to the operator that the breaker is not only isolated by an air dielectric, but that one of the contacts of the disconnecting switch is immersed in an insulating oil and the other is in air.

The switching station in the present instance comprises a three phase system but one phase of which is shown in the plan view comprising Fig. 1, since the apparatus and connections are substantially duplicated in each phase. In connection with the description of the apparatus illustrated in Figs. 1 and 2, reference is had also to the single line circuit diagram illustrated in Fig. 7.

The phase bus cables 1 and 2 which may comprise a main and transfer bus, are lead covered and armored in a well known manner to form an oil-filled metal-clad structure, and are adapted to be connected either individually or together to a line cable 3 of similar construction through switching apparatus hereinafter described. The bus cables for each phase are preferably disposed within separate ducts extending transversely of the phases and overground as illustrated in Figs. 2 and 5.

In this arrangement the three separate phase ducts or passages are formed by walls 4 of suitable rigid material, as concrete, spaced and extending parallel with respect to each other. At suitable intervals for supporting the cables in spaced relation to the ground or bottom of the duct, saddles or similar supports 5 extend between the walls as illustrated, the ends thereof being preferably molded in the concrete. Cover structure 6 for the ducts is likewise provided for protecting the cables from the weather. It will be noted that the spaces above and below the cables permit unrestricted circulation of air through the ducts, thereby preventing excess dampness therein.

The bus cable 1, referring now to a single phase, extends from its duct upwardly to an overhanging metallic housing 7, which is supported in a manner hereinafter described, and is attached to a cable connection or end-bell designated at 8 mounted in and carried by the housing 7. As illustrated in Figs. 1, 2 and 7, the cable is permanently connected to a line connection 11 which may be connected to a ground and test connection 10 by the switch 9. The ground and test connection is also provided with a ground switch 12 for use when the bus cable is to be grounded. For the purpose of duplicating the bus cable 1, the housing 7 is provided with an extension having mounted therein the cable connections 8' to which a duplicate bus cable 1' may be connected. As in the case of the bus cable 1, the cable 1' is likewise connected permanently to the line connection 11. As illustrated in Figs. 1 and 7, there are two each of the cable end-bells 8 and 8' which are disposed at opposite sides of the housing 7 for the cables leading to and from the line connection 11.

The line connection 11 is likewise connected through a disconnecting switch, hereinafter described, indicated generally by 13, to an oil circuit breaker 14. The oil circuit breaker may be of any suitable type whose terminals are electrically connected through conductors within the oil-filled metallic conduits 16 to the similar disconnecting switches 13 and 18 respectively, arranged on each side of the breaker. The armored conduits 16 supported in part by suitable bracing structure 16' are preferably arch-shaped, which therefore readily adapts the circuit breaker and disconnecting switches to the use of conventional cable connections or end-bells 17, thereby making specially designed lead-in connections unnecessary.

Referring again to the circuit connections, the disconnecting switch 18 is connected directly to the line cable 3 through a current transformer 19. The connection to the line cable includes a post insulator 20, Fig. 7, having a connection adapted to be engaged by a ground and test switch 21 which is associated with a grounding blade 22. A disconnecting switch 23 is adapted to isolate the potential transformer 24 from the line cable.

The connections and apparatus between the line cable 3 and the bus cable 2 are substantially identical to those previously described, the disconnecting switch 25 for the oil circuit breaker 26 being connected to the current transformer 19 and to the disconnecting switch 18. A disconnecting switch 27 is connected to the other terminal of the circuit breaker and is connected to the bus cable 2 through the line connection 11. As in the previous instance, the line connection 11 is associated with the test switch 9 and the ground blade 12.

The switch station is provided with tracks 29 disposed in run-ways 29' extending transversely of the phases so that a suitable truck 30 mounted thereon may be run opposite a circuit breaker, and the same, after it has been mechanically and electrically disconnected from the system, rolled onto the truck and moved to a suitable place in the station for repair or inspection. The disconnecting switches and lighter equipment may be transported by usual truck and skids when they are to be repaired or inspected. In installing the metal-clad cable connections between the oil circuit breakers and disconnecting switches a suitable frame mounted on one of the trucks 30, as for example, a so-called "rigger's A-frame" provided with block and tackle, may be used.

Referring more particularly to Fig. 3, there is shown a disconnecting switch embodying my invention comprising a metallic housing 31 having a cover structure 32 through which extends an insulating bushing 33 for the stationary lead-in conductor. The insulating bushing is suitably secured to the cover 32, as by a flanged clamping connection 34, bolted to the bushing and cover 32, and supports the lead-in conductor and its metallic encasing conduit 16. The lower end of the bushing 33 carries a stationary contact member 35 which is adapted to be engaged by a movable contact member 36 carried at the lower end of an insulating member 37 movable with respect to the tank 31. Suitable shields 35a and 36a are mounted at the lower ends of the insulators carrying the contacts 35 and 36. A conductor stud 38 extends longitudinally through the insulator 37 and terminates at its upper portion in another contact member 39 adapted to engage a socket contact 40 in the manner illustrated when the disconnecting switch is in its closed position. Due to the fact that the contact 39 is in sliding engagement with the coacting socket contact 40, variation in length within reasonable limits of the insulator 37 is permitted without affecting the contact engagement. The contact 40 is electrically connected through the terminal cap 41 to the lead-in conductor 42, and is supported and spaced with respect to the cover of the casing 31 by a hollow insulating shell 43 open at its lower end and secured to the cover structure 32 in any suitable manner, as by a clamping ring 44.

It may be pointed out at this time, referring to Fig. 3 and Fig. 7, that the lead-in conductor 42 is permanently connected to a line connection 11, whereby the cables 1 and 2 are directly connected to a terminal of a corresponding disconnecting switch.

The insulating shell 43 is provided with gaskets or other suitable means for making the joints at the opposite ends of the insulating shell between the cap 41 and the cover 32 respectively, oil-tight for the purpose of retaining insulating oil within the metallic shell or extension 45.

The insulator 37, as will be noted, carries two movable contacts of the disconnecting switch in series with the circuit through the switch so that there will be two breaks in series when the insulator 37 is in its lowered isolating position. For the purpose of providing an oil bath for one set of contacts in the closed position, a receptacle 46 open at its upper side and containing an insulating oil 47 is mounted within the casing 31 and carries in any suitable manner, as by the supporting members 48, the insulator 37, so as to be vertically movable therewith as a unit with respect to the casing 31. It will be noted therefore that when the insulator 37 and oil-containing receptacle 46 are in the upper, closed circuit position, the contacts 35 and 36 which extend within the receptacle are immersed in the oil therein. When the oil-containing receptacle 46 and the insulator 37 are lowered to open the disconnecting contacts, the contacts 39 and 40 separate in air and are spaced from each other by air dielectric, and by grounded shutters (not shown) disposed in any suitable manner at the lower end of the insulating shell 43 so as to close when the contacts are open. In accordance with the best practice an air break is provided at each terminal of a circuit breaker when it is in isolated relation to the system.

The contacts 35 and 36 initially separate in oil and are immersed therein until the receptacle 46 has been lowered until the oil level is below the contact 35, whereupon the contact 36 moves to its fully open position, separated from contact 35 by both air and oil dielectric. Since the contact-carrying insulator 37 is fixed with respect to the receptacle 46, and extends partly therein, the contact 36 is immersed in the oil at all times.

Due to the fact that a static discharge often occurs when a single-break disconnecting switch is opened in air, it is desirable in the present instance to cause the contacts 35 and 36, which are oil-immersed, to open before separation of the air-break contacts 39 and 40. To this end, the stationary contact 40 is simply elongated so that the contact 39 is still in engagement therewith after separation of contacts 35 and 36. Accordingly, the static discharge between the air-break contacts 39 and 40 is greatly reduced or eliminated.

For the purpose of suitably raising and lowering the movable contact unit of the disconnecting switch, there are provided supporting lugs 49 bolted at 49a to the receptacle, sliding along vertical guides 50 and operatively connected to screws 51 connected by gearing 52 to suitable driving means, as an electric motor (not shown). It shall be understood that interlocking mechanism of an suitable type may be employed between the motor disconnecting mechanism and the mechanism for operating the main oil circuit breakers so that the circuit breakers shall be opened and closed prior to the opening and closing respectively of the disconnecting switches. Interlocking structure for this purpose is well known in the art and a detailed description thereof is believed unnecessary for a clear understanding of the present invention.

The lower portion of the receptacle 46 is provided with rollers or castors 53 so that the receptacle when in its lower position may be unbolted from the supporting lugs 49 and lowered upon the tracks 54, and if desired, rolled out of the casing 31 through a suitable opening therein.

Referring to Fig. 2, there is provided for this purpose a door 55 in the casing 31 for permitting removal of the oil tank 46 cooperating with an upper adjoining door 56. The door 56 not only permits clearance of the insulator 37 with respect to the casing 31, but is provided with a window 57 so that the position of the insulator 37 may readily be determined by inspection at any time. It is therefore a simple matter to check up on the position of the disconnecting switch so that the chances of injury to workmen are inconsequential.

In connection with the disconnecting switches in Figs. 2 and 3, there is illustrated an overhanging housing or superstructure 7 carried thereby and by the bracing structure 7' for housing and supporting electrical connections, etc., related to the bus cables. The housing 7, referring to the end view in Fig. 4, is adapted to support the insulating cable end bells 8 to which the main bus cable 1 in the present instance is connected. The cable connections preferably extend through portions in the superstructure in the manner of an inverted V in order that bending of the cable between the same and the cable ducts may be minimized. Referring again to Fig. 3, the ground switch 9 having suitable operating means is pivotally mounted upon an insulator 9' carried by and extending through the lower wall of the housing 7, and is adapted to engage the line contact 11 mounted on the insulator 11' for grounding or testing purposes. The ground switch 12 coacting with the contact 10 secured to the lower part of the insulator 9', is pivotally mounted with respect to the stationary structure of the disconnecting switch.

The arrangement of the insulators and cable connections within the housing 7 is best illustrated in the plan view in Fig. 1, which shows the four cable connections and their relation to the line and ground and test connections.

The housing 7 is provided with fluid sealing means for the insulating cable supports, etc., extending through the same and is in communication with the extension 45 of the associated disconnecting switch. An insulating fluid, as oil, fills both the housing 7 and the extension 45.

In Fig. 6 there is illustrated in more detail the current transformer 19 and the structure associated with the same. The current transformer, as previously mentioned, is electrically connected to the phase conductor between the disconnecting switches 18 and 25. These disconnecting switches are joined at their extensions 45 by a metallic conduit 60 having the cover section 61 disposed centrally thereof and above the connections to the current transformer thereby facilitating inspection and access thereto. The conduit is likewise provided with the flanged coupling 60' connecting with the current transformer, and with expansion means, as metallic bellows 62 (Fig. 1) for permitting relative movement at the extremities of the conduit without damaging the same and causing leakage of the oil therein. In connecting the current transformer in the circuit, parallel conductors disposed in one portion of the conduit 60 are employed comprising the main conductor 63 connected, as by clamping, to the lead conductor rod 64, and a concentric tubular conductor 65 connected to the other conductor rod 66. The concentric tubular conductor, which is insulated from the main conductor, is connected through the expansion connection 67, to a post insulator (not shown) disposed within the casing 68. Expansion connections 69 and 70 connect this casing with a housing 71 having a cable end bell (not shown) at the lower side thereof for the line cable 3. Likewise mounted with respect to the casing 68 are the ground and test switches diagrammatically shown in Fig. 7, also showing the connections leading from the post insulator 20.

The current transformer 19 is adapted to be lowered from its operative position, and to this end, it is provided with supporting lugs 72 carried by the transformer tank, and pulleys 73 cooperating with a windlass device 74 mounted upon and disposed at opposite sides of a supporting frame 75 which is in turn mounted upon the disconnecting switches 18 and 25. The disconnecting switches are so spaced that the current transformer 19 may be lowered without interference between the same to the ground level.

Since the current transformer is a self-contained unit, the cover of which is secured to supporting framework, inspection thereof may be had in either of two ways. The transformer as a unit may be lowered to the ground and transported to a suitable place for inspection, or the transformer tank casing may be lowered, leaving the transformer itself supported by the framework 75. In the first instance, it is of course necessary first to unclamp the lead conductor rods 64 and 66 from their conductors within the conduit 60, unbolt the flange coupling 60' and unbolt the transformer top from its supporting frame, before lowering the entire unit.

It shall be understood that my invention is not limited to the specific details of construction or arrangement thereof herein illustrated, and that changes and modifications will occur to one skilled in the art without departing from the spirit of my invention.

What I claim as new and desire to secure by Letters Patent of the United States, is:

1. In a metal-clad high tension switching station, a disconnecting switch for electrically isolating apparatus in said station with respect to its associated circuit, comprising a metallic casing, stationary contacts insulated from and supported by said casing, a movable insulating member having contacts mounted at opposite ends thereof arranged in series with the circuit through said disconnecting switch, means operable to move said insulating member so as to effect disengagement of the contacts carried thereby with the coacting stationary contacts, and means for immersing one of said pairs of contacts in an insulating oil during closed position of the switch, the other pair of contacts being separated in and spaced by air when the switch is in its open isolating position.

2. In a metal clad, high tension switching station, a disconnecting switch for electrically isolating apparatus in said station comprising a supporting casing, two stationary contacts mounted in said casing, a movable member carrying two coacting contacts forming respectively two pairs of contacts connected in series, an oil receptacle in which only one pair of said contacts coact so as to be oil immersed in the closed circuit position of the disconnecting switch, the other pair of contacts coacting entirely in air so as to be air-insulated in the open circuit position of the disconnecting switch, and means actuating said movable member between open and closed circuit positions.

3. In a metal-clad high tension switching station, a disconnecting switch for electrically isolating apparatus of said station comprising a metallic casing, a contact insulated from and disposed within said casing, a relatively movable contact for cooperating therewith, an insulating member supporting the movable contact, a second movable contact carried by said member, a contact fixed with respect to said casing adapted to be engaged by said second contact, said contacts being arranged to form two breaks in series in the circuit through the disconnecting switch, an insulating oil within which only the first named pair of cooperating contacts is immersed when the switch is in its closed position, and operating means for moving said insulating member to an open, isolating position so that the last named pair of contacts are separated in and insulated from each other by air.

4. In a metal-clad high tension switching station, a disconnecting switch for electrically isolating apparatus of the station comprising a metallic casing, a fixed contact insulated from and supported within said casing, an insulator having a contact carried at one end thereof adapted to engage the fixed contact, an insulating shell mounted upon said casing and adapted to receive said insulator, a contact carried at the opposite end of said insulator adapted for sliding engagement with a coacting contact mounted within said shell, all of said contacts being in series in the circuit through the disconnecting switch, a receptacle vertically movable as a unit with said insulator within the casing, an insulating oil contained within said receptacle, and elevating mechanism operable to move said insulator and receptacle to open and closed positions of the switch, the insulator in the open circuit position having one of its contacts insulated solely by air from its coacting contact, and its other contact immersed in oil within said receptacle.

5. In metal-clad switchgear, a disconnecting switch comprising a metallic casing, a movable oil-containing receptacle disposed within said casing, two disconnecting contacts carried by said receptacle, one of said contacts being in air and the other immersed in oil in said receptacle, and means for lowering said receptacle causing isolation of one of said contacts in oil and the other in air.

6. In a metal-clad, high tension switching station, a disconnecting switch for electrically isolating apparatus in said station comprising a metallic supporting casing, two stationary contacts mounted in said casing, a movable member carrying two coacting contacts forming with said stationary contacts two pairs of contacts connected in series, an oil receptacle in which only one pair of said contacts coact, said pair of contacts engaging and separating within oil, the other pair of contacts coacting entirely in air and provided with means insuring separation thereof subsequent to separation of said oil immersed contacts, and means actuating said movable member for opening and closing said pairs of contacts.

HERMAN J. H. HUBER.